United States Patent [19]
Lawrence et al.

[11] 3,942,573
[45] Mar. 9, 1976

[54] TIRE LUBRICATING DEVICE

[75] Inventors: James Philip Lawrence, Wadsworth; James Dennis Gardner, Akron, both of Ohio

[73] Assignee: The Firestone Tire & Rubber Company, Akron, Ohio

[22] Filed: Jan. 30, 1975

[21] Appl. No.: 545,262

[52] U.S. Cl. ........ 152/330 L; 152/330 RF; 152/427; 152/347
[51] Int. Cl.² .................... B60C 17/00; B60C 19/12
[58] Field of Search .......... 152/330 RF, 330 L, 399, 152/400, 347, 427; 222/541

[56] References Cited
UNITED STATES PATENTS

| | | | |
|---|---|---|---|
| 2,399,572 | 4/1946 | Powell et al. | 152/400 |
| 2,552,336 | 5/1951 | Marcum | 152/400 |
| 2,742,202 | 4/1956 | Dresden et al. | 222/541 |
| 3,850,217 | 11/1974 | Edwards et al. | 152/330 RF |
| 3,850,220 | 11/1974 | Mitchell | 152/330 RF |

FOREIGN PATENTS OR APPLICATIONS

| | | | |
|---|---|---|---|
| 1,359,461 | 7/1974 | United Kingdom | 152/330 L |

*Primary Examiner*—Drayton E. Hoffman

[57] ABSTRACT

This disclosure relates to a fluid reservoir and dispensing means and pneumatic tire-rim combination containing the reservoir and dispensing means. The reservoir is a hollow annular structure adapted to be located in the drop center area of the rim. The dispensing means is a breakable valve attached to the reservoir which is so situated in the tire cavity that it will be fractured by the tire when the tire is run uninflated thereby releasing the fluid into the tire cavity.

15 Claims, 3 Drawing Figures

TIRE LUBRICATING DEVICE

BACKGROUND OF THE INVENTION

This invention relates to a means for providing a fluid in the internal cavity of a pneumatic tire when the tire is run flat. So situated, the fluid (which may contain a lubricant, a puncture sealing material and a reinflation material or any combination of these), when it contains a lubricant, helps eliminate the abrasion (and resulting heat build-up) that occurs when the inner surfaces of a tire chafe on one another when the tire is run flat. It is now known that this function of a lubricant greatly facilitates the run-flat characteristics of a tire and permits certain tire constructions to be run flat a considerable distance at considerable speeds without destroying the remaining useful life of the tire.

The lubricant accomplishes this goal by forming a film between the areas of the tire which abrade upon one another. This film decreases the amount of heat build-up caused by this abrasion.

Other methods are known and have been disclosed for providing the inner periphery of a pneumatic tire with a fluid composition. One of these methods is to merely coat the inner periphery with the composition or to merely place the composition on the inner periphery with the composition permitted to move as the tire rotates. Methods of this type have never proven practical. The major drawback has been that the composition becomes ineffective (deteriorates or dries up) after being in the ambient conditions in the tire cavity for a period of time and the non-uniform location of the composition in the tire caused a vibration in the vehicle.

One of the other means which has been suggested is designed to eliminate this type of problem. This means includes a reservoir or storage chamber in which the lubricant is stored until the tire is run flat. The lubricant is released when the tire is run flat. This means retains the lubricant in an operative form until it is required.

Several mechanical devices have been disclosed to store the lubricant and to make it available for use at the proper time (when the tire is run flat). These prior methods have had various shortcomings, such as a complicated construction and valve system to dispense the lubricant, difficulty in mounting the reservoir, difficulty in mounting the tire when the reservoir is contained on the rim and the requirement for non-standard rims or tires to be specially designed to facilitate the incorporation of the reservoir and dispensing means. Also great damage could be caused by these prior devices breaking loose during operation.

It is an object of this invention to provide a tire-rim combination with a reservoir and dispensing means for holding and dispensing a lubricant into the inner periphery of the tire when the tire is run flat.

It is another object of this invention to provide a simple, inexpensive, uncomplicated reservoir and valve dispensing system for supplying the lubricant to the inner periphery of a tire when it is run flat.

It is another object of this invention to provide a light-weight lubricant reservoir and dispensing means for a tire which will not cause an out of balance condition in the combination with the tire and rim.

It is another object of this invention to supply a simple, uncomplicated means of attaching the reservoir and dispensing valve system to a tire rim.

It is yet another object of this invention to provide a reservoir, dispensing valve system and fastening means for a lubricant which can be utilized in any standard tire-rim combination and can be so utilized without causing difficulty in mounting the tire onto the rim.

SUMMARY OF THE INVENTION

The objects of this invention are accomplished by providing a tire-rim combination with a flexible annular reservoir member which can be mounted on the outer periphery of the drop center area of a standard rim. This flexible, annular member is hollow and provides the chamber or reservoir for containing the lubricant and/or sealant when the tire is being operated under normal conditions. This reservoir retains the integrity of the lubricant for great lengths of time so that it will not deteriorate due to non-use in the atmospheric conditions that exist in the air cavity of a pneumatic tire.

The annular member is constructed by securing each end of a flexible, hollow tube to a valve member. The annular member may have any cross-section desirable. The Applicants have found that a circular cross-section is particularly useful. The tube must be made of a flexible material so that it may be easily mounted in the drop center area of the rim. Its flexibility must be such that the annular member can slip over the rim flange and to be placed in the drop center area of the rim. Its flexibility must also permit it to yield when the tire is being mounted on the drop center rim. During this mounting step, the beads of the tire are required to move into the drop center area of the rim. Due to the flexibility of the annular member, this movement of the beads is not impaired and ease of mounting is maintained. The Applicants have found that a flexible material, such as a polyolefin polymer compound, is useful in this application.

The annular reservoir member contains a simple, uncomplicated valve member. The valve is comprised of a hollow cylinder which is attached to the tube at its ends, a laterally extending foot member located intermediate the ends on the radially inner part of the cylinder which is designed to rest upon the outer periphery of the drop center area of the rim to support the cylinder, and a breakable, elongated, hollow, closed end protrusion which is attached to the cylinder opposite the supporting foot member in cooperation with a hole in the cylinder. This elongated protrusion is molded of breakable material having a thin portion at its base. It sticks out into the air cavity of the pneumatic tire. It is so located that it will be broken at its thin portion by the inner periphery of the tire when the tire is deflated and carrying a load. This protrusion has a hollow center which is directly connected to the lubricant reservoir thereby permitting the lubricant to flow into the air cavity when the protrusion is broken by a combination of centrifugal, vehicle acceleration, deacceleration and gravity actions.

The foot of the valve is so designed to give the valve a stable foundation. Without this foundation, the elongated protrusion could merely be pushed out of the way by the deflated tire and would not break.

The side of the valve opposite the foot may be cut out to accept the valve stem of the tire valve in the rim. This helps to prevent the annular member from slipping around the circumferences of the rim and prevents the annular member from interfering with the air pressure reading taken from the valve.

Due to its necessary flexibility, the annular member would be expanded by the centrifugal force acting upon it when the tire is rotated unless it is attached firmly to the rim. It is secured to the outer periphery of the drop center area of the rim by means of a annular piece of material which is located inside the hollow reservoir. This fastening means is tightened by manipulating its ends through the hole in the valve member upon which the elongated protrusion is later attached. The Applicants have found that a piece of ductile wire is useful for this fastening means. The wire is placed within the hollow chamber of the annular member with both of its ends extending out through the hole in the valve. The two wire ends are then twisted around one another by any convenient method or tool. This twisting causes the wire to tighten and, thereby, secures the annular member to the rim. The portion of the twisted wire ends which extends out beyond the hole in the valve is then cut off by any known method or tool. The hollow cavity of the annular member is filled with lubricant via the hole in the valve. The hole in the valve is then closed by the elongated protrusion, making the lubricant reservoir operative.

It is envisioned that the fastening means may be eliminated by using a material for the annular member which would have sufficient elongation to permit it to be mounted on the rim (in the same manner as a tire is mounted by having part of it drop into the drop center area of the rim when the rest of the tire is being mounted), yet has sufficient elasticity to snap into place on the drop center area of the rim and strength to resist the centrifugal forces acting on it. Such an arrangement would require a mounting tool. The Applicants envision that the use of the fastening means is preferred.

The steps in assembling tire-rim combination of this invention are:

1. The fastening means (wire) is placed inside the hollow tube with the ends of the fastening means (wire) extending out beyond the tube ends.
2. The wire ends are passed through the hollow ends of the valve member and out through the hole in the valve member.
3. The ends of a piece of hollow, flexible tube are connected to a valve member to form the annular member.
4. The annular reservoir, being flexible, is slipped over the rim flanges and positioned above the drop center area of the rim.
5. The fastening means is tightened so that the annular member is firmly fastened to the outer periphery of the drop center area of the rim.
6. The excess of the fastener means is removed.
7. The hollow chamber of the annular member is filled with the fluid (lubricant and/or sealant).
8. The elongated, breakable protrusion is mounted on the hole in the valve sealing the reservoir so that the lubricant cannot escape.
9. The tire is then mounted on the rim by standard procedures and inflated with the mounting starting so that the protrusion is positioned in the tire cavity.

The lubricant is freed from the annular chamber by breaking the elongated projection. This projection is broken by the inner periphery of the tire when the tire is deflated and run flat. The elongated projection must be so located so that it will not break during the normal operation of the tire. It must be a certain minimum distance from the inner periphery of the tire so that it will not break when the tire is deflected in its normal operation and it must be so located that it will be broken by the tire when the tire is run flat.

DETAILED DESCRIPTION OF THE INVENTION

Figure 1:
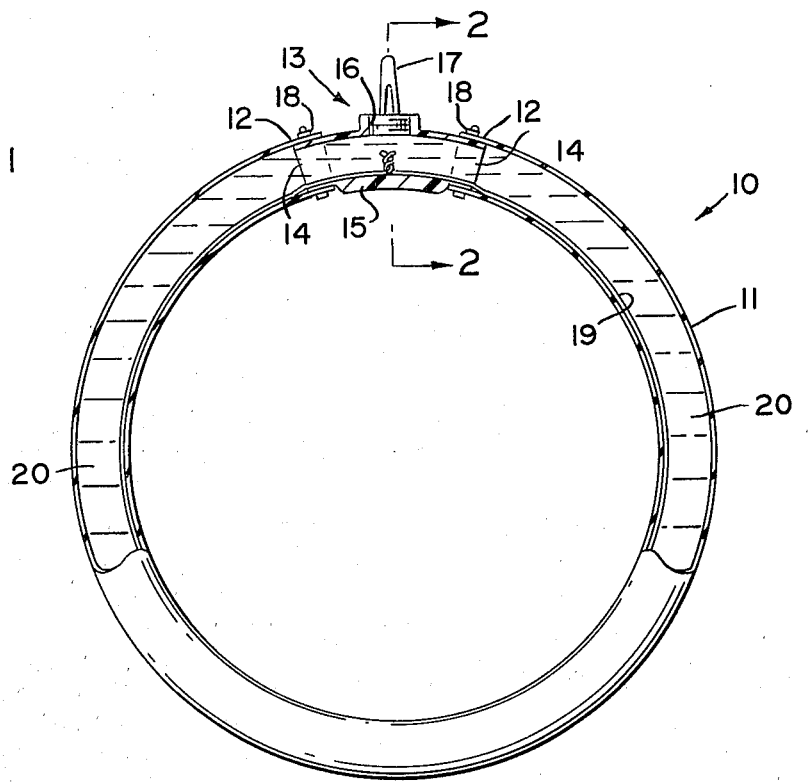
FIG. 1 is a sectional side view of the annular reservoir member of this invention.

Referring to FIG. 1 the flexible, hollow, annular reservoir member is shown generically as 10. It comprises the flexible, hollow tube member, 11, which has its ends, 12, fastened to the valve member, shown generally as 13. The valve member comprises a hollow, open-ended cylinder having hollow ends, 14, lateral supporting foot, 15, intermediate the hollow ends on the bottom (radially inward) of the member, 13, and a threaded hole, 16, on the top of the hollow cylinder directly above the foot member. The breakable protrusion, 17, is adapted to fit into the threaded hole, 16, to seal the valve. The ends, 12, of the flexible tube have a diameter equal to or greater than the diameter of the ends, 14, of the valve member.

The protrusion preferably has a thin section, 23, which will break more readily than the other parts of the protrusion. This feature results in a breakage at a predetermined place so no sharp, rough edges are formed which might damage the tire during its run-flat condition.

In assembling the annular member, a fastener means, 19, is placed in the hollow tube with the ends of the fastener member extending beyond the ends of the tube. One end of the fastener means is passed through one of the hollow ends of valve member and out through the hole, 16, and the other end of the fastener means is passed through the other hollow end of the valve member and out through hole, 16. Each end of the tube is then pushed over the companion end of the valve member and secured thereto by an adjusting locking ring, spring clamp or crimped clamp, 18. So secured, the valve member and tube form the hollow, annular reservoir member with a single opening at the threaded hole, 16, in the valve.

In this condition the annular member is placed in the drop center area of the tire rim by extending the annular member over the rim flange. Of course, the rim flange has a greater diameter than the drop center area of the rim that the annular member is designed to rest in. After the annular member has been so located in the drop center area of the rim, the ends of the fastening means are twisted around one another thereby decreasing the diameter of the fastening means until the means firmly holds the flexible annular member to the outer periphery of the drop center area of the rim. After this is accomplished, the ends of the fastening means are removed so that the fastening means is completely retained in the tube and valve member. The ends in this condition are shown in FIGS. 1, 2 and 3.

The fluid, 20, is then injected into the annular member through the hole, 16, in the valve until the chamber is completely filled. The breakable protrusion, 17, is then secured to the hole, 16, to completely seal the fluid in the annular member. In this condition, the annular member of this invention is operable and the only thing that remains is to mount the tire on the rim, as shown in FIG. 2.

Figure 2:
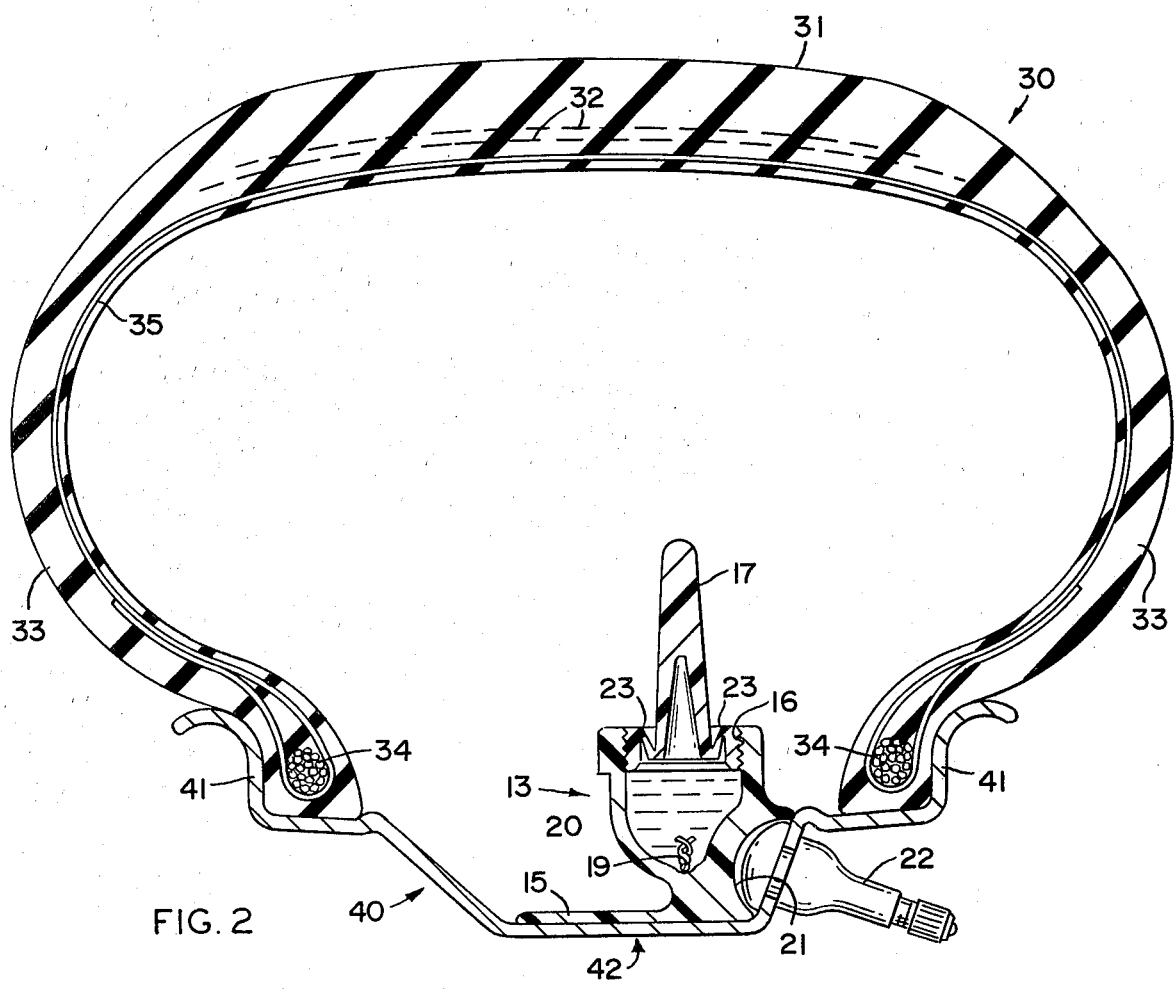
FIG. 2 is a cross-sectional view of a tire-rim combination having the annular reservoir member mounted in the drop center area of the rim. The annular reservoir member is shown in cross-sectional view through the line 2—2 in FIG. 1.
Figure 3:
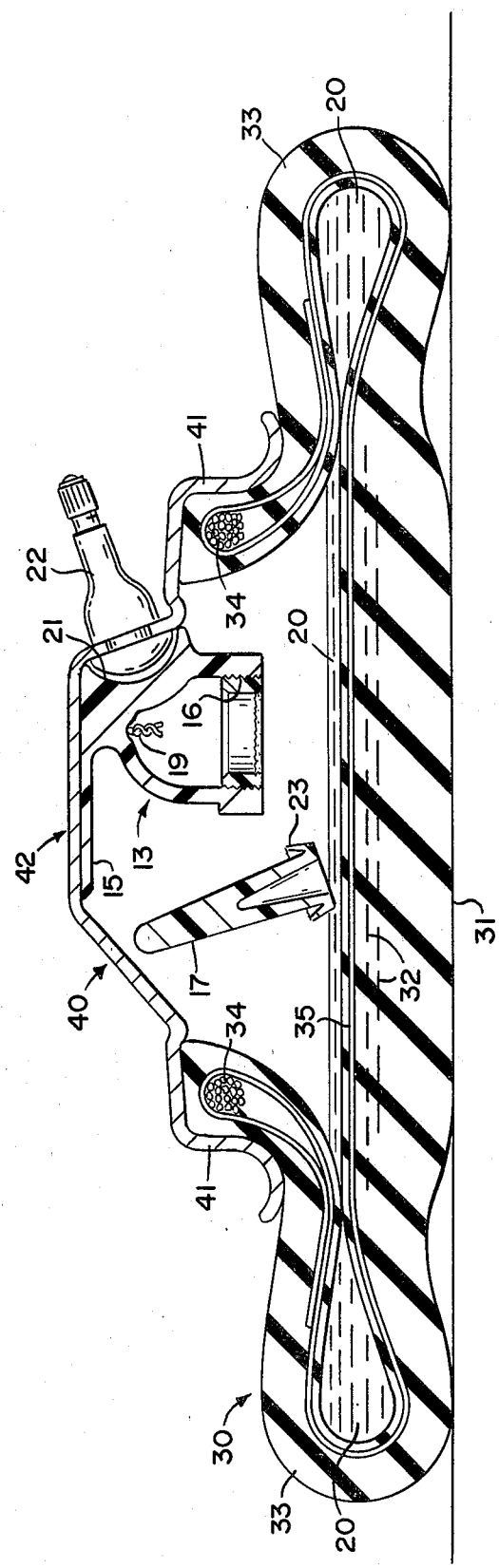
FIG. 3 is a cross-sectional view of the tire-rim combination of FIG. 1 after the tire has been run flat showing the fluid in the reservoir after it has been released into the tire.

FIG. 2 shows the tire-rim combination of this invention with the annular reservoir member in place in its operative condition. The tire is shown generally as 30 having a road-engaging tread surface, 31, containing two belt plies, 32, two sidewalls, 33, connecting the tread surface to annular beads, 34, and a single body ply, 35. This general construction is typical of a radial ply passenger tire. It is understood that this invention is not limited to any particular tire construction and may be used with any of the known tire constructions.

The standard drop center rim is shown generally as 40 having rim flanges, 41, and drop center area, 42.

Preferably the valve member has a cut-out portion, 21, on the cylinder intermediate the hollow ends and on the side opposite the foot member. This cut-out portion, 21, in FIGS. 2 and 3 is designed to fit valve stem, 22, which is located in the tire rim. The valve member has laterally extending ribs, not shown, located on both sides of the valve stem, 22, which trap the valve stem in the chamber defined by the cut-out portion and the two ribs. This prevents the annular member from moving circumferentially when the tire rotates. It also insures that the annular member will not interfere with a proper reading of the air pressure in the tire taken through the valve.

FIG. 3 shows the tire-rim combination of FIG. 2 after the tire has been deflated and run flat. FIG. 3 shows that the breakable protrusion, 17, has been broken by the inner surface of the tire during the run-flat operation. This breakage permits the fluid, 20, contained in the annular member to be released into the tire cavity. This fluid then coats the periphery of the tire cavity lubricating the tire cavity and decreasing the damage that occurs to the tire due to its being operated in a run-flat condition.

The fluid may also contain a puncture sealing material which would act to seal small punctures in the tire. It may also contain a volatile type material which would act to give the tire some reinflation pressure after the sealant has closed any puncture. The primary function of the fluid is to act as a lubricant on the periphery of the tire cavity.

After the tire has been repaired, the annular reservoir member may be used again by merely replacing the fluid and the breakable protrusion. This enables the vehicle operator to retain the run-flat capabilities of the tire with little extra expense.

We claim:

1. In combination, a pneumatic tire, a rim and an annular reservoir member, said tire having an annular road-engaging tread surface, sidewall portions connecting each side of said tread surface to annular bead rings, said rim having an annular drop center area and a rim flange located axially outwardly of said drop center area on both sides thereof, said tire adapted to be mounted on said rim, said annular reservoir member comprising a flexible, annular tube, a continuous, annular, inextensible fastener means, and a hollow valve member, said valve member having a hollow chamber connected to two lateral, hollow end portions, a supporting foot member intermediate said end portions adapted to rest in the drop center area of the rim, a hole intermediate said end portions opposite said foot member, and a breakable member adapted to fit said hole to seal said valve member, the ends of said annular tube connected to said hollow ends of said valve member in sealed relationship to yield a continuous annulus, said fastener means located in said continuous annulus formed by said annular tube and valve member, said fastener means adapted to be tightened to restrict the circumference of said annular tube to constrict said annular tube into gripping relationship with said drop center area of said rim while permitting said tube to retain sufficient axial and radial flexability to permit the beads of said tire to enter the drop center area of said rim during mounting thereon, said annular reservoir member containing a fluid and positioned so that said fluid is retained in said annular reservoir member during normal operation of the tire and said fluid is released into the tire cavity when said tire is run flat to lubricate the inner periphery of said tire by said tire breaking said breakable member in its run-flat operation.

2. The combination of claim 1 wherein said fastener means is a ductile wire.

3. The combination of claim 1 wherein said valve member has a cut out portion adapted to receive the tire inflation valve which is mounted on said rim thereby inhibiting said annular reservoir member from circumferential movement during the rotation of said tire.

4. The combination of claim 1 wherein said breakable member is an elongated, hollow, member having a closed end and an open end, said open end adapted to fit said hole in said hollow chamber of said valve member and said closed end positioned to protrude into the tire cavity.

5. The combination of claim 1 wherein said breakable member has a weak spot to facilitate the breakage thereof in a predetermined location, said location situated to prevent any sharp edges from contacting said tire.

6. The combination of claim 1 wherein said fluid contains a lubricant.

7. The combination of claim 1 wherein said fluid contains a sealant material.

8. The combination of claim 1 wherein said fluid contains a reinflation material.

9. The tire of claim 1 wherein said flexible tube comprises a polyolefin polymer compound.

10. An annular fluid reservoir member adapted for cooperation with a pneumatic tire and rim combination, said reservoir member comprising a flexible, annular tube, a valve member and a continuous, annular, inextensible fastener means, said valve member having a hollow chamber connecting with hollow ends, a supporting foot member intermediate said hollow ends on the radially inner side of said valve member and a hole located intermediate said hollow ends on the radially outer side of said valve member, and a breakable member adaptable to fit said hole in said valve in sealed relationship, said tube connected at its ends in sealed relationship to said hollow ends of said valve member to form a continuous annulus, said fastener means located in said continuous annulus and adapted to be tightened to restrict the circumference of said tube to constrict said tube into gripping relationship with the drop center area of the rim while permitting said tube to be substantially axially and radially flexible, said annular reservoir member adapted to be positioned in the drop center area of the rim.

11. The annular reservoir member of claim 10 wherein said fastener means is a ductile wire.

12. The annular reservoir member of claim 10 wherein said valve member has a cut out portion adapted to receive a tire inflation valve which is mounted on a rim thereby prohibiting said annular reservoir member from circumferential movement during the rotation of the tire.

13. The annular reservoir member of claim 10 wherein said breakable member is an elongated, hollow, member having a closed end and an open end, said open end adapted to fit said hole in said hollow chamber of said valve member and said closed end positioned to protrude into the tire cavity.

14. The annular reservoir member of claim 10 wherein said breakable member has a weak spot to facilitate the breakage thereof in a predetermined location.

15. The annular reservoir member of claim 10 wherein said flexible tube comprises a polyolefin polymer compound.

* * * * *